(12) United States Patent  
Hama et al.

(10) Patent No.: US 7,280,850 B2  
(45) Date of Patent: Oct. 9, 2007

(54) COMMUNICATION TERMINAL AND DISPLAY METHOD

(75) Inventors: Mitsuji Hama, Higashiosaka (JP); Tadahiro Emoto, Kobe (JP); Kazuaki Nakae, Higashiosaka (JP); Namika Haraguchi, Takarazuka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1030 days.

(21) Appl. No.: 09/965,291

(22) Filed: Sep. 27, 2001

(65) Prior Publication Data

US 2002/0039915 A1 Apr. 4, 2002

(30) Foreign Application Priority Data

Sep. 29, 2000 (JP) ............................. 2000-301030  
Sep. 29, 2000 (JP) ............................. 2000-301031  
Sep. 29, 2000 (JP) ............................. 2000-301032

(51) Int. Cl.  
*H04B 1/38* (2006.01)

(52) U.S. Cl. .................... 455/566; 455/564; 455/556.1

(58) Field of Classification Search ................ 455/566, 455/564, 550.1, 556.1, 556.2, 557; 715/784, 715/817, 830, 810, 825, 829, 841; 345/169  
See application file for complete search history.

(56) References Cited

U.S. PATENT DOCUMENTS 6,661,437 B1 12/2003 Miller et al.

FOREIGN PATENT DOCUMENTS

| CN | 1255210 | | 5/2000 |
|----|---------|---|--------|
| JP | 409167188 A | * | 6/1997 |
| JP | 10-308810 | * | 11/1998 |
| WO | WO9959097 | | 11/1999 |
| WO | WO0055717 | | 9/2000 |

* cited by examiner

*Primary Examiner*—Melur Ramakrishnaiah

(57) ABSTRACT

A communication terminal stores items which compose a hierarchical menu. The communication terminal displays items of one hierarchy on a display, and then displays lower level items, which correspond to an item which has been selected from among the displayed items by a user operation, without a display instruction operation by the user.

22 Claims, 15 Drawing Sheets

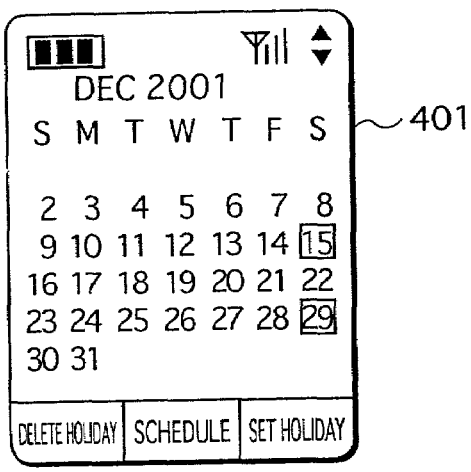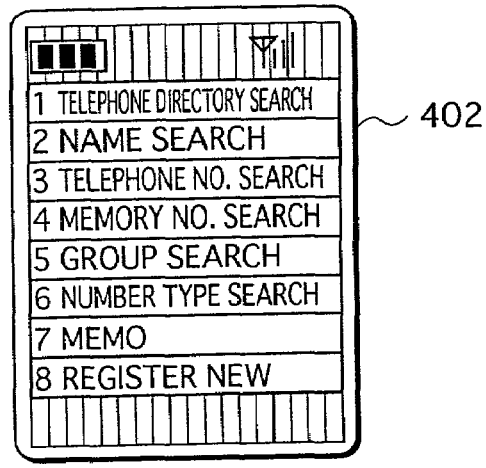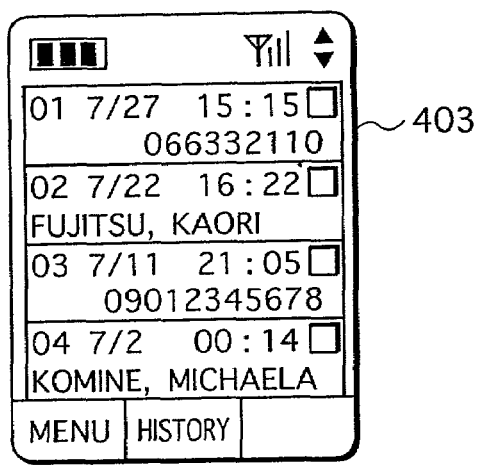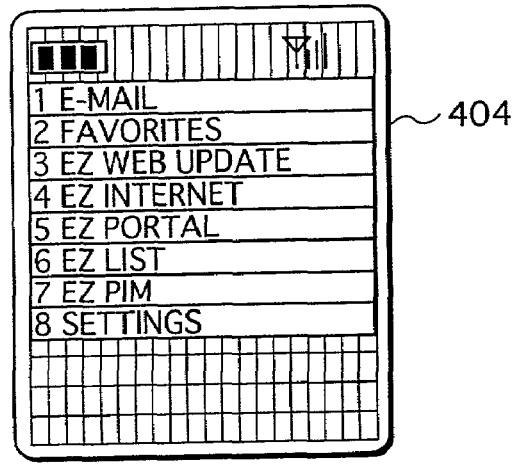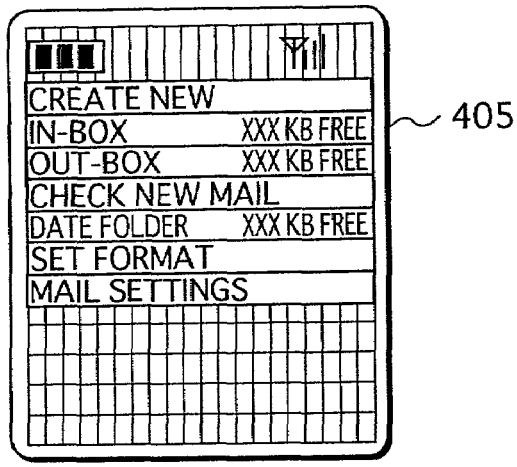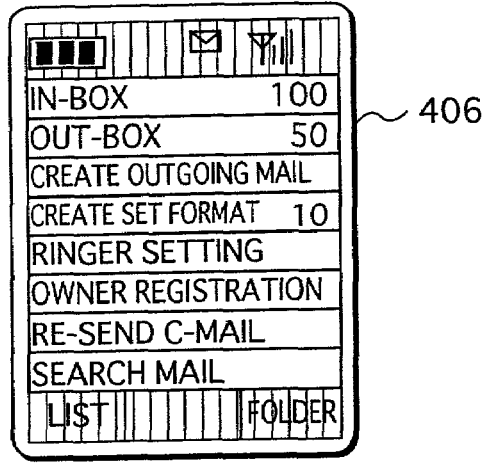
Fig.4

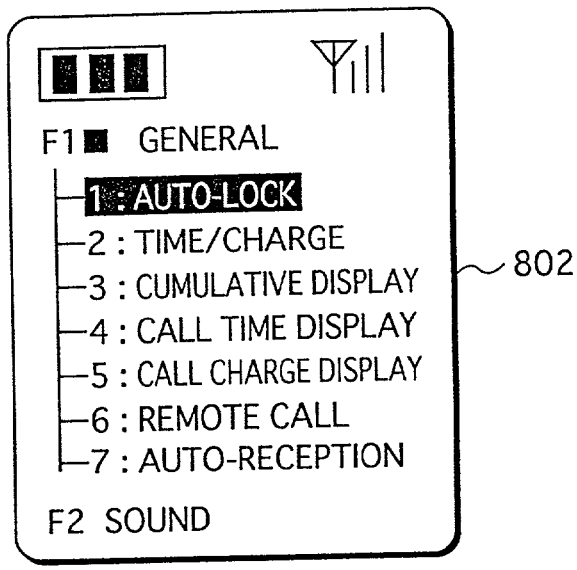
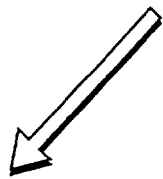
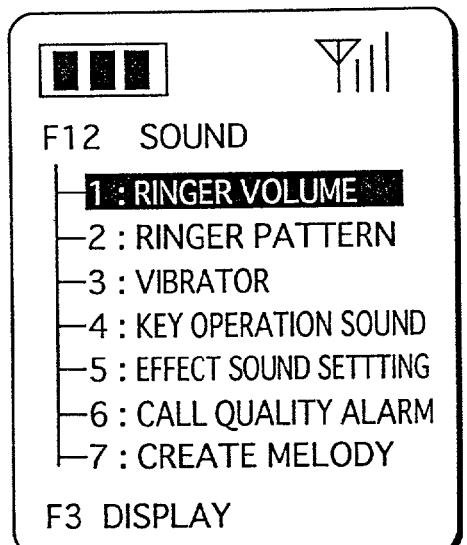 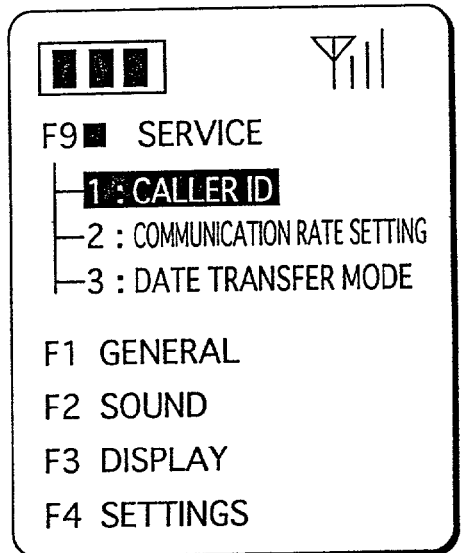
Fig.10

COMMUNICATION TERMINAL AND DISPLAY METHOD

BACKGROUND OF THE INVENTION (1) Field of the Invention

The present invention relates to a communication terminal, and in particular to improvement of a user interface in the communication terminal.

(2) Description of the Prior Art

In recent years, communication terminals which are used in systems such as PHS (Personal Handyphone System) and PDC (Personal Digital Cellular telecommunication system) have become widespread. In particular, such communication terminals are becoming multifunctional. In addition to voice communication functions, they have telephone directory and schedule management functions, customizable functions of which detailed operation settings can be made, internet connection functions, e-mail transmission/reception functions, and so on. This fuels competition between manufacturers to increase users.

Conventional communication terminals have a user interface known as a hierarchical menu to enable users to use this host of functions effectively. The hierarchical menu categorizes items for the various functions and setting values hierarchically, and displays a portion of the items with each hierarchy. The user can select the numerous functions without confusion by key operations in stages at each hierarchy. These selection operations are realized by a key for moving between items within the same hierarchy and a key for moving up and down between hierarchies.

However, with a hierarchical menu, it may be necessary to perform a number of operations to reach a desired item, depending on the depth and number of items in a hierarchy. This gives rise to a problem that it may take much time and effort from the user to execute one function. A mistake by the user in selection operations could mean that a series of operations from a top level to reach a lower level are completely wasted.

These problems mean that improvement of conventional user interfaces of hierarchical menus is an important issue in communication terminals.

SUMMARY OF THE INVENTION

The object of the present invention is to provide a communication terminal and a display method that improve operability with an improved user interface.

In order to achieve the stated object, the communication terminal is a communication terminal which (i) groups a plurality of setting items for related internal functions of the communication terminal into a top level item, and (ii) displays that the group of setting items belongs to the top level item, including: a selection key for selecting a setting item from the plurality of setting items; a display unit for displaying the selected setting item; a confirmation key for confirming the selected setting item and proceeding to a setting screen therefor; a changing unit for changing, in the setting screen of the confirmed setting item, a setting value of the setting item; a measuring unit for measuring a length of time for which the selected setting item is displayed; and a setting value display unit for displaying, when the length of time exceeds a predetermined length of time, the setting value of the selected setting item. Here, the setting value display unit may form a popup window on part of a setting item screen in which the plurality of setting items are being displayed, and display the setting value of the selected setting item in the popup window. Furthermore, the setting value display unit may, when an operation of the selection key is performed while the setting value of the selected setting item is being displayed, stop displaying the setting value, and return to displaying the setting item screen.

According to the stated construction, a user can confirm items which come below a top level item without any particular operations from the user. Therefore, the burden on the user in operating the communication terminal is reduced.

Furthermore, in order to achieve the stated objective, the communication terminal is a communication terminal which (i) groups a plurality of setting items for related internal functions of the communication terminal into one of a plurality of top level items, (ii) displays that the group of setting items belongs to the top level item, and (iii) displays the top level item together with the group of setting items that belong thereto, including: a selection key for selecting one of the plurality of top level items; and a display control unit for controlling displaying of the plurality of top level items and the plurality of setting items, wherein the display control unit has one selected top level item and the group of setting items which belong thereto displayed, and has only top level items displayed for top level items which have not been selected.

According to the stated construction, items which come below a top level item are displayed automatically. Therefore a user can confirm items which come below a top level item without any particular operations from the user. As a result, the burden on the user in operating the communication terminal is reduced.

Furthermore, the stated object is achieved by a communication terminal which displays, when a memory dial function is used, a plurality of registered names of parties to which a telephone call is possibly made, and initiates, according to a predetermined operation, the telephone call to a telephone number which corresponds to a selected registered name, including: a call destination selection unit for selecting one name from the displayed plurality of registered names; a measuring unit for measuring a length of time for which the selected registered name is displayed; a first display unit for displaying, when the length of time measured by the measuring unit exceeds a predetermined length of time, a plurality of telephone numbers and e-mail addresses which correspond to the selected registered name; a second display unit for displaying, when the predetermined operation is performed while the plurality of telephone numbers and e-mail addresses is being displayed on the first display unit, only the telephone numbers; a telephone number selection unit for selecting one telephone number from the plurality of telephone numbers being displayed on the second display unit; and a call initiation unit for initiating a telephone call to the selected telephone number. Here, the first display unit may form a popup window on part of a screen in which the plurality of registered names are being simultaneously displayed, and display the plurality of telephone numbers and e-mail addresses of the selected setting item in the popup window According to the stated construction, specifically, both telephone numbers and e-mail addresses of a highlighted name of a party are displayed after a predetermined period of time elapses from when the name is highlighted, therefore the user can confirm a plurality of contact details of the highlighted name without having to perform any particular operations. As a result, the burden on the user in operating the communication terminal is reduced. Furthermore, the user can confirm at once not only telephone numbers, but also other ways of contacting a party who uses other methods of contact.

Furthermore, when there is a predetermined key operation while the plurality of contact details (or the screen 511) are being displayed, the communication terminal switches to a display of only one type of contact details. Therefore, the user can confirm the one type of contact details only.

Conventionally, in order to contact a party, the user must first determine by which method they will contact the party, then perform a different search operation to search for the to find the contact details depending on the method of contact. In contrast, in the present invention contact details which correspond to a plurality of contact methods are displayed at once, therefore the user can determine how to contact the party when the contact methods are displayed. The user can search a plurality of contact methods for a party with one type of search operation, and make contact through one.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 is an example of a displayed screen;

FIG. 10 shows other examples of screen transitions from screen 802;

FIG. 14 is an example of a screen when an auto-lock function is set to ON; and

DESCRIPTION OF THE PREFERRED EMBODIMENTS

The following explains an embodiment of the present invention with reference to the drawings.

First Embodiment

Figure 1:
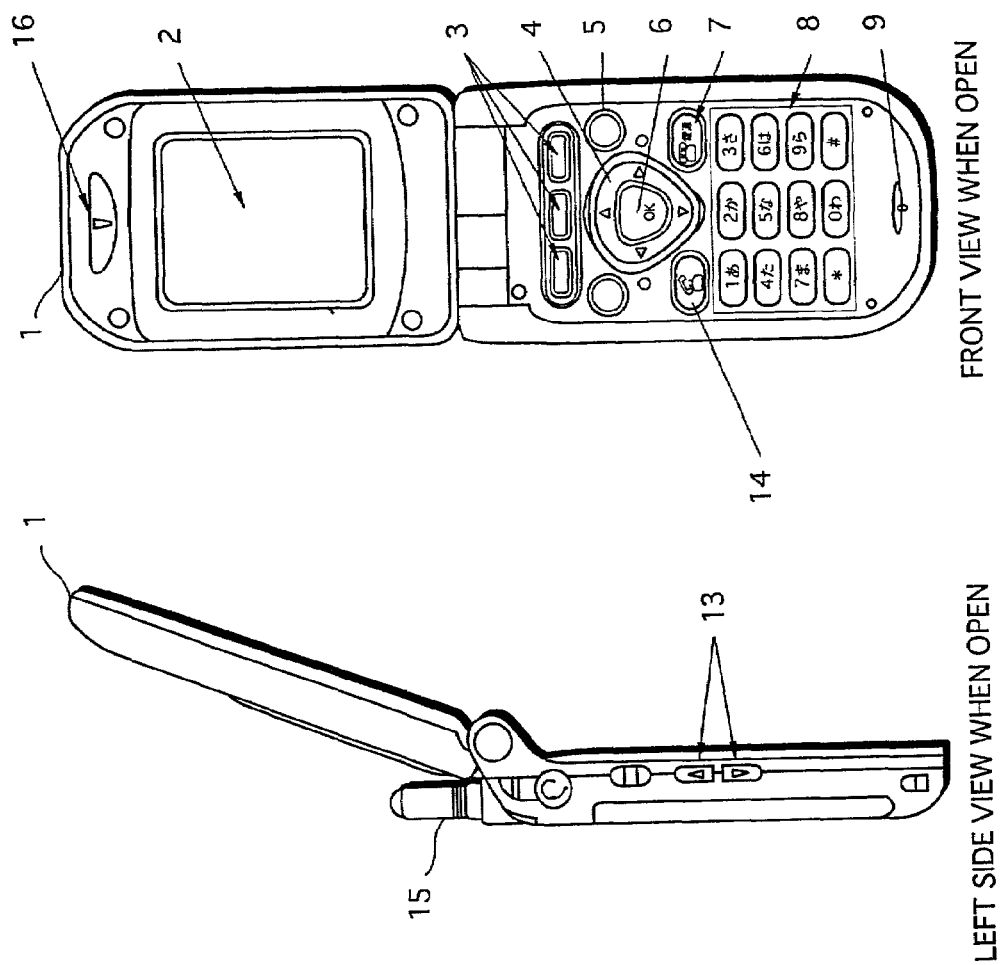
FIG. 1a and FIG. 1b are outer views of the communication system of the present invention.

FIG. 1a and FIG. 1b are outer views of the communication terminal 1 of the present invention. FIG. 1a shows a front view of the communication terminal 1 in an open state, and FIG. 1b shows a left side view of the communication terminal 1 in the open state.

A display 2 is a self-luminous or lighted multicolored luminous display, and is composed of a lighted color LCD display device, a DMD (Digital Micromirror Device), an organic EL (ElectroLuminescent) display device, and so on. The display 2 displays various types of information to the user including the present time, electric field strength, and information about callers.

A flexible key 3 is for selecting items displayed on a lower part of the display 2.

A four-position key 4 has an up button, a down button, a left button, and a right button for moving a cursor, display contents, and a highlight displayed on the display 2 left, right, up, and down.

An e-mail key 5 is for an e-mail function.

A menu/OK key 6 is positioned in the center of the four-position key and is for proceeding to menu items and for confirming selected items.

A power/end key 7 is for turning the power on and off, and is used to end a conversation.

A numeric keypad 8 is for inputting telephone numbers, characters, and so on.

A microphone 9 is for inputting voice.

Side scroll keys 13 are used for scrolling a displayed page up and down, is composed of a up key and a down key.

A start key 14 is used when making and receiving calls.

An antenna 15 is used when receiving and transmitting the necessary radio waves for communication.

A speaker 16 outputs a ringer sound, a caller's voice, sound notifying reception of various types of messages, and so on.

Figure 2:
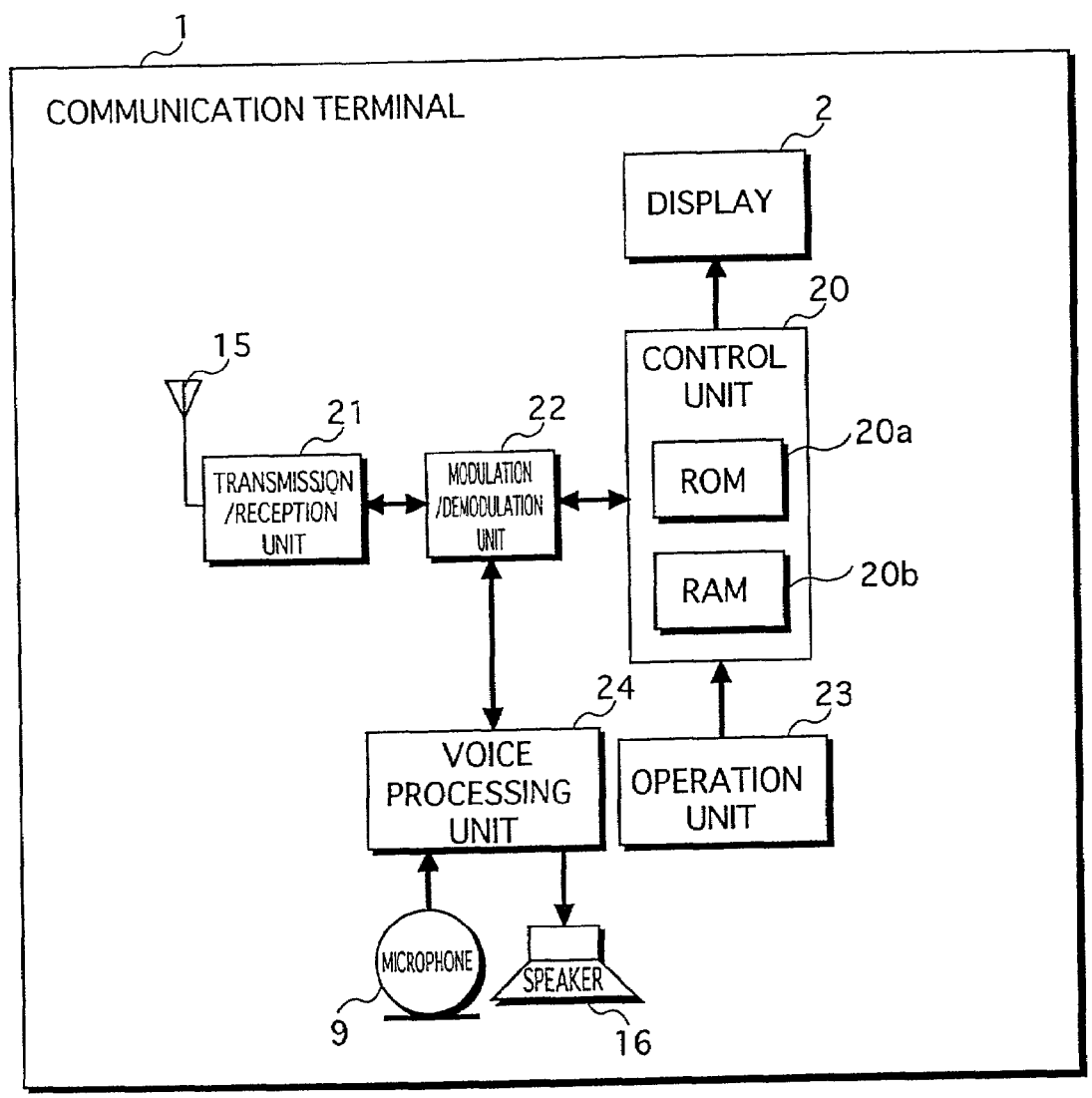
FIG. 2 is a block drawing showing the construction of the communication terminal of the present invention.

FIG. 2 is a block drawing showing the structure of the communication terminal 1.

As shown in FIG. 2, the communication terminal 1 is composed of the antenna 15, a transmission/reception unit 21, a modulation/demodulation unit 22 (which includes a base band processing unit for performing CDMA processing), a voice processing unit 24, the microphone 9, the speaker 16, a control unit 20, the display 2, and an operation unit 23.

The antenna 15, the transmission/reception unit 21, the modulation/demodulation unit 22, the voice processing unit 24, the microphone 9, and the speaker 16 are controlled by the control unit 20 to realize functions such as calls and e-mail which conventional portable communication terminals generally have.

The operation unit 23 is composed of the flexible key 3, the four-position key 4, the e-mail key 5, the menu/OK key 6, the end/power key 7, the numeric key pad 8, the side scroll keys 13, and the start key 14.

The control unit 20 has a microprocessor, a ROM (read only memory) 20a, and a RAM (random access memory) 20b. The control unit 20 controls according to the microprocessor executing a control program which is stored in the ROM 20a.

In particular, the control unit 20 performs display control in response to user operations using a unique display control method, the purpose of which is to improve operability of the communication terminal 1.

The following explains in detail the control method performed by the control unit 20.

Figure 3:
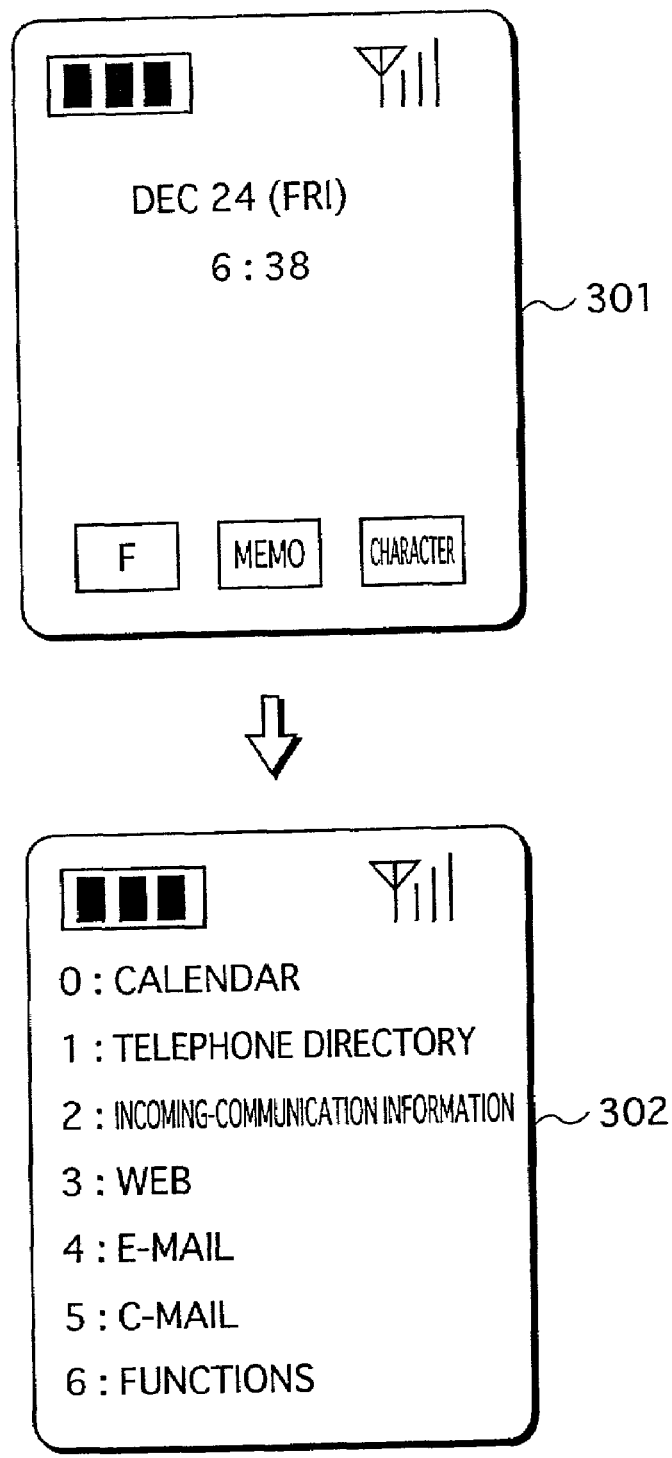
FIG. 3 is an example of a screen which is displayed on the display 2.

FIG. 3 is examples of screens displayed on the display 2.

In FIG. 3, a screen 301 shows the display screen when the communication terminal 1 is in stand-by. The screen 301 has an icon in the top left corner showing the amount of remaining battery power, an antenna pictograph in the top right corner showing the electric field intensity, the date and time in the center towards the top, an F button which corresponds to the flexible key 3, a memo button, and a character button.

When the menu/OK key 6 is operated while the screen 301 is displayed on the display 2, the control unit 20 switches the display to a screen 302.

The screen 302 is a menu screen which displays a list of the names of various functions of the communication terminal 1.

When the one of the keys from 0 to 6 on the numeric key pad 8 is pressed while the screen 302 is displayed on the screen 2, the control unit 20 switches from the screen 302 to a screen which corresponds to the function in the list of the key that was pressed. In FIG. 4 the screens 401 to 406 are screens which are transitioned to when the numeric keys 0 to 5 (hereinafter each of the numeric keys of the numeric key pad 8 will be referred as "numeric key 1" etc.) respectively are pressed. For example, an operation of the numeric key 0 results in a transition to the calendar function screen 401. An operation of the numeric key 1 results in a transition to the telephone directory screen 402.

The control unit 20 also switches from the screen 302 to the screens 401 to 406 by operations of the up button and down button of the four-position key 4 and the menu/Ok key 6, instead of the numeric keys on the numeric key pad 8. Specifically, operations of the up button the down button of the four-position key 4 move the highlight of one of the items in the list of the functions up and down respectively. Then, when the menu/OK key 6 is pressed, the control unit 20 switches the screen to the screen of the function that corresponds to the name that was being highlighted at the time the menu/OK key 6 was pressed.

Figure 5:
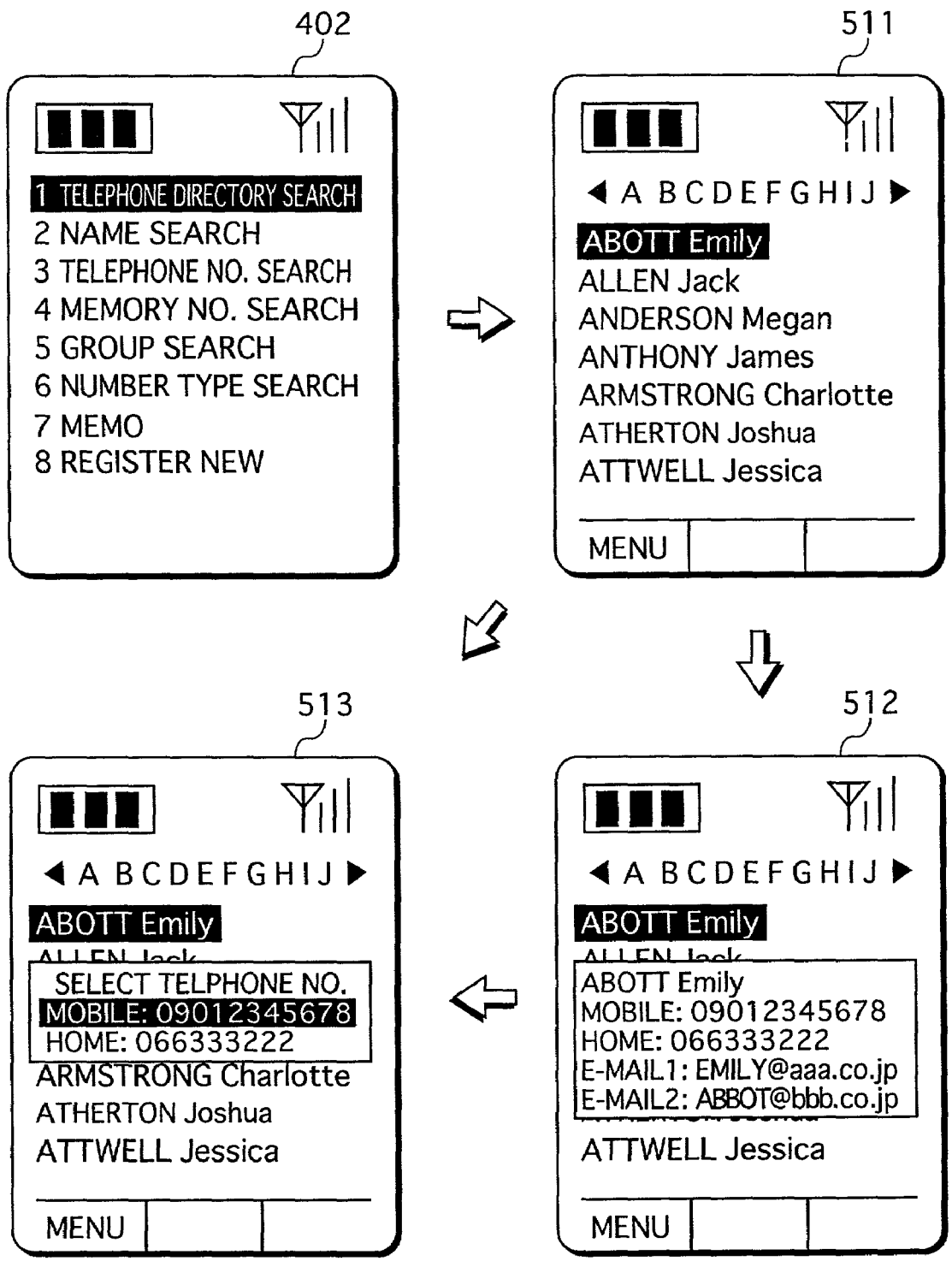
FIG. 5 shows transitions from screen 402 which is one screen of a telephone directory function.

FIG. 5 shows the transition in the displayed screen from the screen 402 which is one screen of the telephone directory function.

The screen 402 in FIG. 5 displays a list of names of a plurality of functions which belong to the telephone directory function, such as "1 directory search", "2 name search", and "3 number search", and soon. When the menu/OK key 6 or the numeric key 1 is pressed while "1 directory search" is being highlighted on the screen 402, the control unit 20 switches from the screen 402 to a screen 511. The screen 511 is the telephone directory search screen, and displays a list in alphabetical order of names of parties whose telephone numbers are registered in the RAM 20*b*. Directly after moving from the screen 402 to the screen 511, the control unit 20 highlights the name "ABBOTT Emily" which is the first in alphabetical order of the registered names. This shows that this name is selected.

When the down button of the four-position key 4 is pressed while the screen 511 is being displayed, the control unit 20 highlights the name "ALLEN Jack" which is one line below "ABBOTT Emily", showing that "ALLEN Jack" is selected. On the other hand, when the up button of the four-position key 4 is pressed while the screen 511 is being displayed, the name which is one row above "ABBOTT Emily" and is last of the registered names of the parties whose telephone numbers are registered is highlighted, showing that this name is selected. Furthermore, letters A, B, C, D, and so on are displayed towards the top of the screen 511, amongst which A is highlighted. When the right button or the left button of the four-position key 4 is pressed, the control unit 20 moves the highlight left and right along the letters accordingly, and at the same time has a list of names corresponding to the highlighted letter displayed.

When the control unit 20 detects, while the screen 511 is being displayed, that a predetermined period of time has elapsed during which the user has not performed any operation, the control unit 20 retrieves the registration contents such as the telephone number and e-mail address regarding the selected name "ABBOTT Emily", and has the retrieved contents overlaid on the screen 511 in a pop-up display, as shown in the screen 512. Here, the predetermined amount of time is, for example, 2 seconds. In the screen 512, the contents are "ABBOTT Emily"'s mobile phone number "MOBILE: 09012345678", home telephone number "HOME: 0663332222", e-mail address "E-MAIL 1: EMILY@aaa.co.jp", and second e-mail address "E-MAIL 2: ABBOTT@bbb.co.jp", which are displayed enclosed by a rectangle.

In this way, when a name is highlighted and a predetermined period of time elapses without the user performing an operation, the control unit 20 retrieves the registered contents which correspond to the highlighted name from the RAM 20*b*, and has the contents displayed in a pop-up display.

When the start key 14 is pressed while the screen 512 (or the screen 511) is being displayed, the control unit 20 switches the pop-up display to a pop-up display whose contents have been narrowed down to the telephone numbers, as shown in a screen 513. The telephone numbers in the registered content for "ABBOTT Emily" are the mobile phone number "MOBILE: 09012345678", and the home phone number "HOME: 0663332222", so the control unit 20 has these two telephone numbers displayed. Here, control unit 20 has one of the telephone numbers highlighted, showing that that telephone number is selected. In the screen 513 "MOBILE: 09012345678" is selected.

When the start key 14 is pressed while the display state is the screen 513, the control unit 20 initiates a call to the highlighted number "MOBILE: 09012345678". On the other hand, when the up button or the down button of the four-position key 4 is pressed, the control unit 20 highlights "HOME: 0663332222", showing that this number is selected. When the start key 14 is subsequently pressed, the control unit 20 initiates a call to "PHONE: 0663332222".

Note that, although not illustrated, when the e-mail key 5 is pressed while the display state is the screen 512 the control unit 20 switches the pop-up display whose contents have been narrowed down to the first e-mail address "E-MAIL 1: EMILY@aaa.co.jp", and the second e-mail address "e-mail 2: ABBOTT@bbb.co.jp" from the pop-up display in the screen 512, an highlights one of the e-mail addresses. When the e-mail key 5 is subsequently pressed again in this state a screen for writing an e-mail to the highlighted e-mail address is displayed. After the user has finished writing the e-mail, the e-mail is sent to the highlighted address.

Note that the present embodiment has a structure in which at the screen 512 the control unit 20 initiates a call to a telephone number when the start key 14 has been pressed twice, but if there is only one telephone number registered for a name, the control unit 20 initiates a call to the telephone number after the start key 14 has been pressed once. Furthermore, the control unit 20 may be structured to initiate a call to one telephone number after the start key 14 has been pressed once even if there are two or more telephone numbers registered. In such a case, a mark may be recorded in the RAM 20*b* with one telephone number for each party, and the control unit 20 may be structured to initiate a call to the marked telephone number when the start key 14 is pressed while the control content is displayed in a pop-up display. The user may perform an instruction operation to determine which telephone number is marked.

Figure 6:
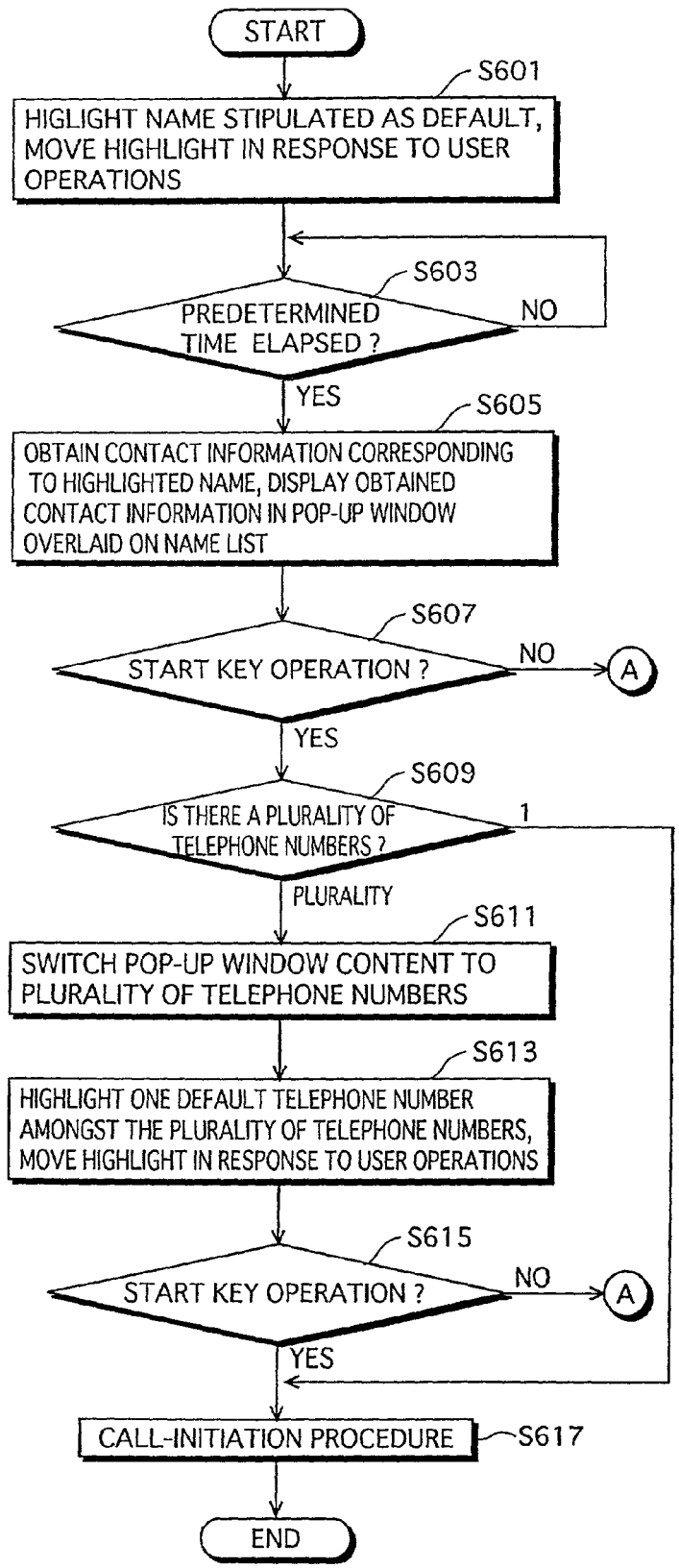
FIG. 6 is a flowchart showing the procedures of the control unit 20 that are explained above using FIG. 5.
Figure 7:
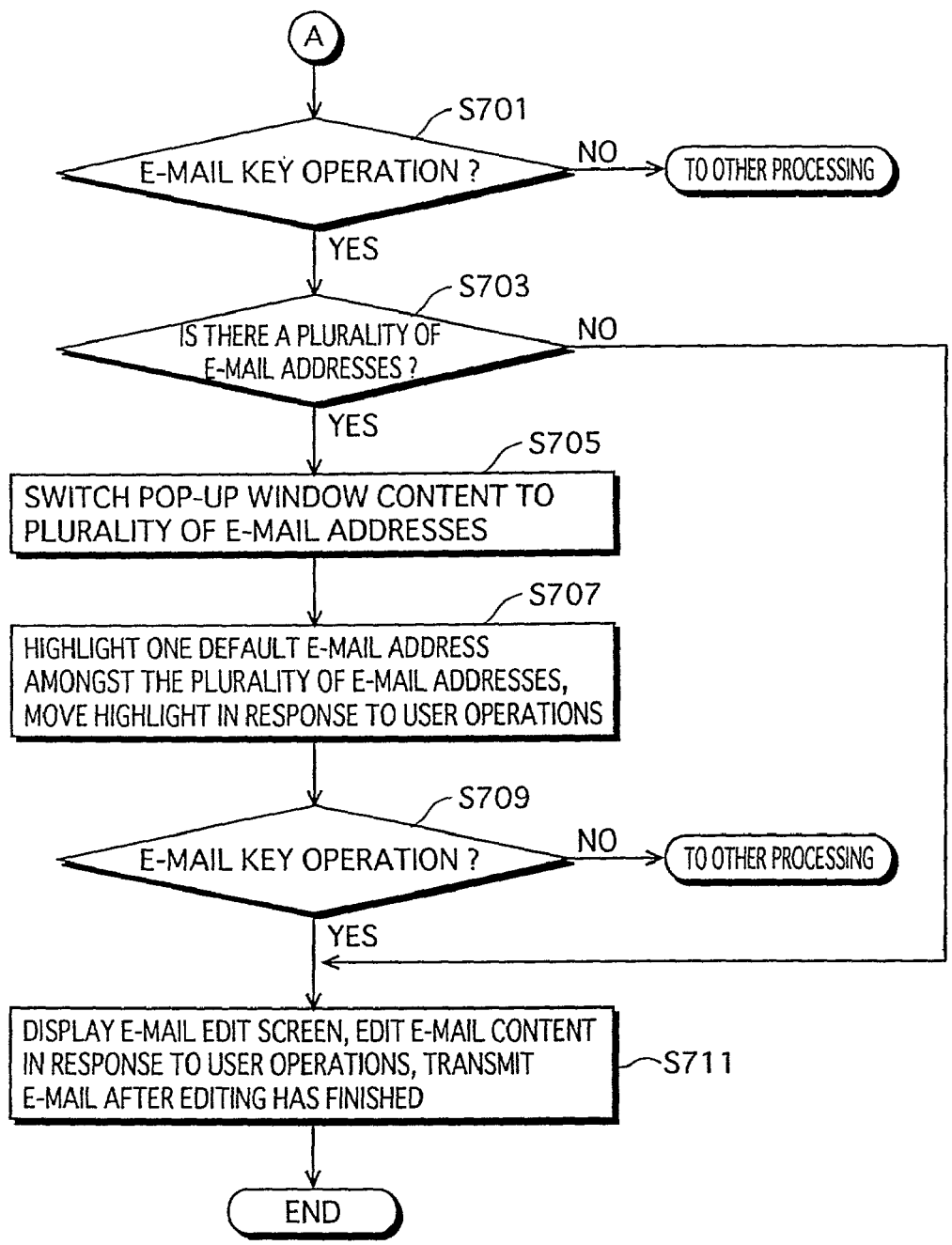
FIG. 7 is a flowchart showing the procedures of the control unit 20 that are explained above using FIG. 5.

FIG. 6, and FIG. 7 are flowcharts showing the procedures of the control unit 20 that are explained above using FIG. 5.

At step S601, the control unit 20 displays the list of the parties' names and highlights one of the parties' names (screen 511) In the initial state the control unit 20 displays a list of the names which come at the beginning of the alphabet, and highlights the first name. Then the control unit 20 moves the highlight and the list according to operations of the four position key 4 by the user.

At step S603 the control unit 20 judges whether the highlight of one name has continued for a predetermined time, in other words whether a predetermined period of time has elapsed during which the user has not performed any operation.

At step S605, when the control unit 20 judges that the predetermined amount of time has lapsed, it obtains contact information from the RAM 20b that corresponds to the name which is highlighted, and displays the obtained contact information in a pop-up display (screen 512).

Next, at step S607, after judging that the start key 14 has been pressed, the control unit 20 proceeds to step S609. Here, if the control unit 20 detects any other operation, it proceeds to step S701 in FIG. 7. FIG. 7 will be explained later.

At step S609 the control unit 20 judges whether there is one or a plurality of pieces of contact information displayed in the pop-up display, and proceeds to step S611 if there is a plurality, and to step S617 if there is one.

At steps S611 and step S613 the control unit 20 switches a display of pluralities of both telephone numbers and e-mail addresses to a display of telephone numbers only (screen 513), and highlights one of the telephone numbers. The first telephone number is highlighted by default. Note that if one of the plurality of telephone numbers has been written with a mark in the RAM 20b that telephone number is be highlighted. Subsequently, the control unit 20 moves the highlight in response to operations up and down of the four-position key 4 by the user.

At step S615, when the user presses the start key 14 the control unit 20 proceeds to step S617, and proceeds to step S701 in FIG. 7 if the user performs any other operation.

At step S617, when the user presses the start key 14, the control unit 20 initiates a call to the telephone number which is highlighted.

At step S607 and step S615, if the user performs any other operation besides pressing the start key 14, the control unit 20 proceeds to step S701 in FIG. 7, and judges whether the operation is an operation of the e-mail key 5. If the operation is an operation of the e-mail key 5 the control unit proceeds to step S703. If the operation is any other operation the control unit 20 proceeds to other processing. Such other processing will not be described since it is not directly relevant to the present invention.

At step S703 the control unit 20 judges whether there is one or a plurality of e-mail address in the contact information in the popup display. The control unit 20 moves to step S705 when there is a plurality, and to step S711 when there is one.

At step S705 and step S707, the control unit 20 switches a display of pluralities of both telephone numbers and e-mail address to a display of e-mail addresses only. Then the control unit 20 highlights one of the e-mail addresses. The top e-mail address is highlighted by default. Subsequently, the control unit 20 moves the highlight in response to operations up and down of the four-position key 4 by the user.

At step S709, the control unit 20 proceeds to step S711 when the user presses the e-mail key 5, and to other procedures when any other key is pressed.

At step S711 the control unit 20 displays a screen for writing e-mail to the e-mail address that was highlighted when the e-mail key 5 was pressed, edits the e-mail text in response to operations by the user, and transmits the e-mail to the e-mail address when the user has finished writing.

As described above, when a predetermined amount of time elapses while a name is highlighted, the control unit 20 displays the telephone numbers and e-mail addresses corresponding to the name. Therefore the user can confirm a plurality of possible ways to contact a highlighted party without having to perform any special operations, meaning that the burden on the user in operating the communication terminal 1 is reduced. Conventionally the user cannot confirm a party's contact information at screen 511 without performing at least one operation, for example, pressing the menu/OK key 6. However, in the present invention the user can confirm a party's contact information without a key operation, and can confirm not only telephone numbers but also e-mail addresses.

In addition, when the start key 14 or the e-mail key 5 is pressed while the registration content (or the screen 511) is being displayed, the control unit 20 switches to a screen whose content has been narrowed down accordingly to either telephone numbers or e-mail addresses, one of which is then highlighted. Therefore, the user can confirm only telephone numbers or only e-mail addresses. When the start key 14 or the e-mail key 5 is pressed again subsequently the control unit 20 accordingly initiates a call or proceeds to a screen for writing e-mail. Therefore, the user can select one way of contacting a party from amongst a plurality pieces of contact information which include both telephone numbers and e-mail address, and contact the party.

Conventionally, the user must first determine whether to contact the party by calling or by e-mail, and then search the telephone numbers if they have determined to call the party, or search e-mail addresses if they have decided to contact the party by e-mail. This means that the user may not be able to contact the party without further performing operations depending on the initial selection. Conventionally, if the user decides to contact the party by e-mail but finds after searching the e-mail address that the party does not have an e-mail address, the search of the e-mail addresses has been a waste. In contrast, with the present invention, both a party's telephone numbers and e-mail addresses are displayed at once, and the user can determine how they will contact the party when both the telephone numbers and e-mail addresses are displayed. Unlike conventional communication terminals, with the present invention there is no need for the user to determine in advance whether they will contact a party by telephone or by e-mail.

Second Embodiment

The following explains a second embodiment of the present invention.

The communication terminal of the present embodiment has the same outer view and block functions as the communication terminal of the first embodiment, therefore in the following explanation the structural components have the same reference numbers as in the first embodiment.

Figure 8:
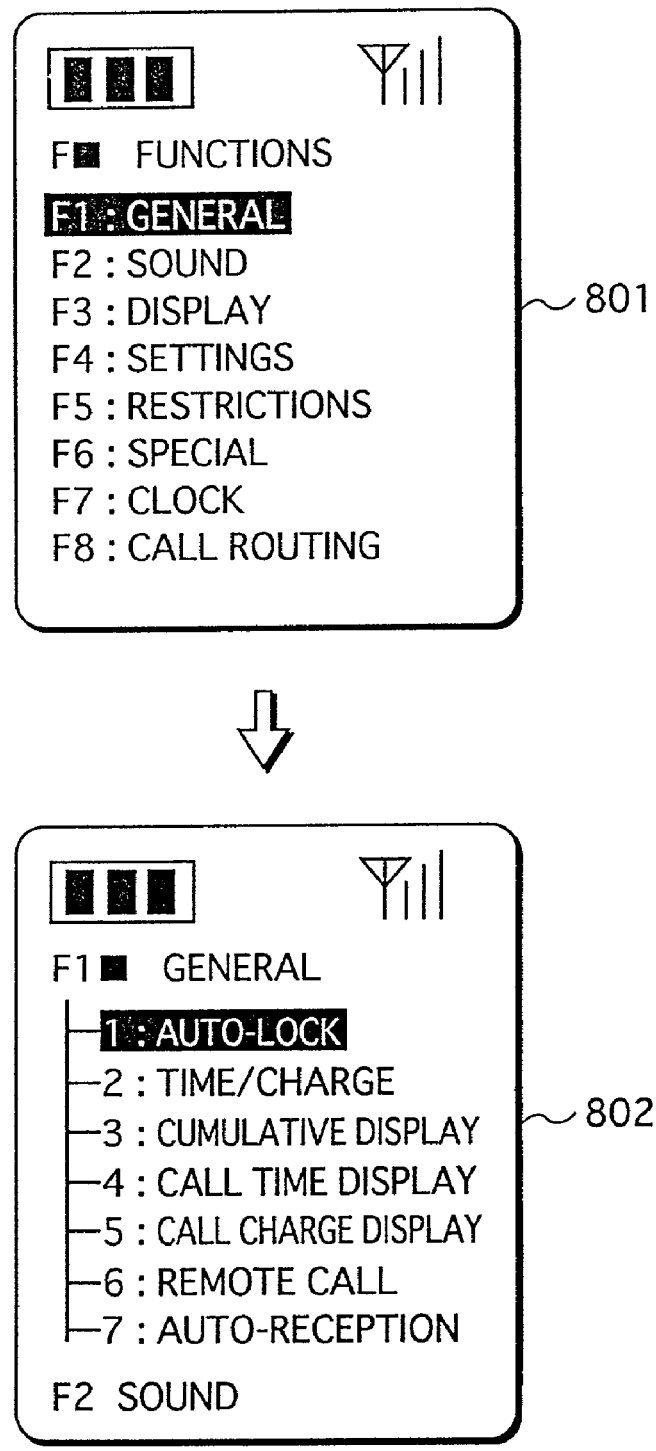
FIG. 8 is a screen showing a list of function items.

FIG. 8 is a screen which shows a list of function items.

When the numeric key 6 is pressed while the screen 302 in FIG. 3 is being displayed, the control unit 20 switches the display from the screen 302 to a screen 801.

The screen 801 shows top level items of the functions, and the battery power icon and the antenna pictograph are displayed. The top level functions are "F1: General", "F2: Sound", "F3: Display", "F4: Settings", "F5: Restrictions", "F6: Special", "F7: Clock", "F8: Call Routing", and "F9: Service". Note that since there is a limit to the number of lines that can be displayed in the screen 801 "F9: Service" is not displayed.

In "F■ Function" which is displayed below the battery icon, "■" represents a cursor. When one of the keys on the numeric number pad 8 is pressed, the control unit 20 has the number of the pressed key displayed in this cursor area, then displays items which are one level below the top level item, in other words middle level items, which corresponds to the key which has been pressed below the top level item, and highlights the first middle level item. If the menu/OK key 6 is pressed subsequent to the highlight being moved according to the up and down keys of the four-position key 4, the control unit 20 performs the above-described process for the highlighted top level item.

More specifically, if the numeric key 1 is pressed when the screen 801 is being displayed, the control unit 20 displays "1" in the cursor area, for example "F1 Function" and then immediately displays the middle level items which come under the top level item which corresponds to the number, in this case "F1: General". Here, the middle level items are "1: Auto-lock", "2: Time/charge", "3: Cumulative Display", "4: Call Time Display", "5: Call Charge Display", "6: Remote Call", and "7: Auto-reception". The control unit 20 highlights the first middle level item "1: Auto-lock". This shows that this item is selected.

Note that the control unit 20 displays the middle level items on the display 2, and then if there is any area left at the bottom of the screen, displays top level items which follow the top level item whose middle level items are being displayed, in the area. In the case of the screen 802, the control unit 20 displays "F2: Sound" in the space.

Figure 9:
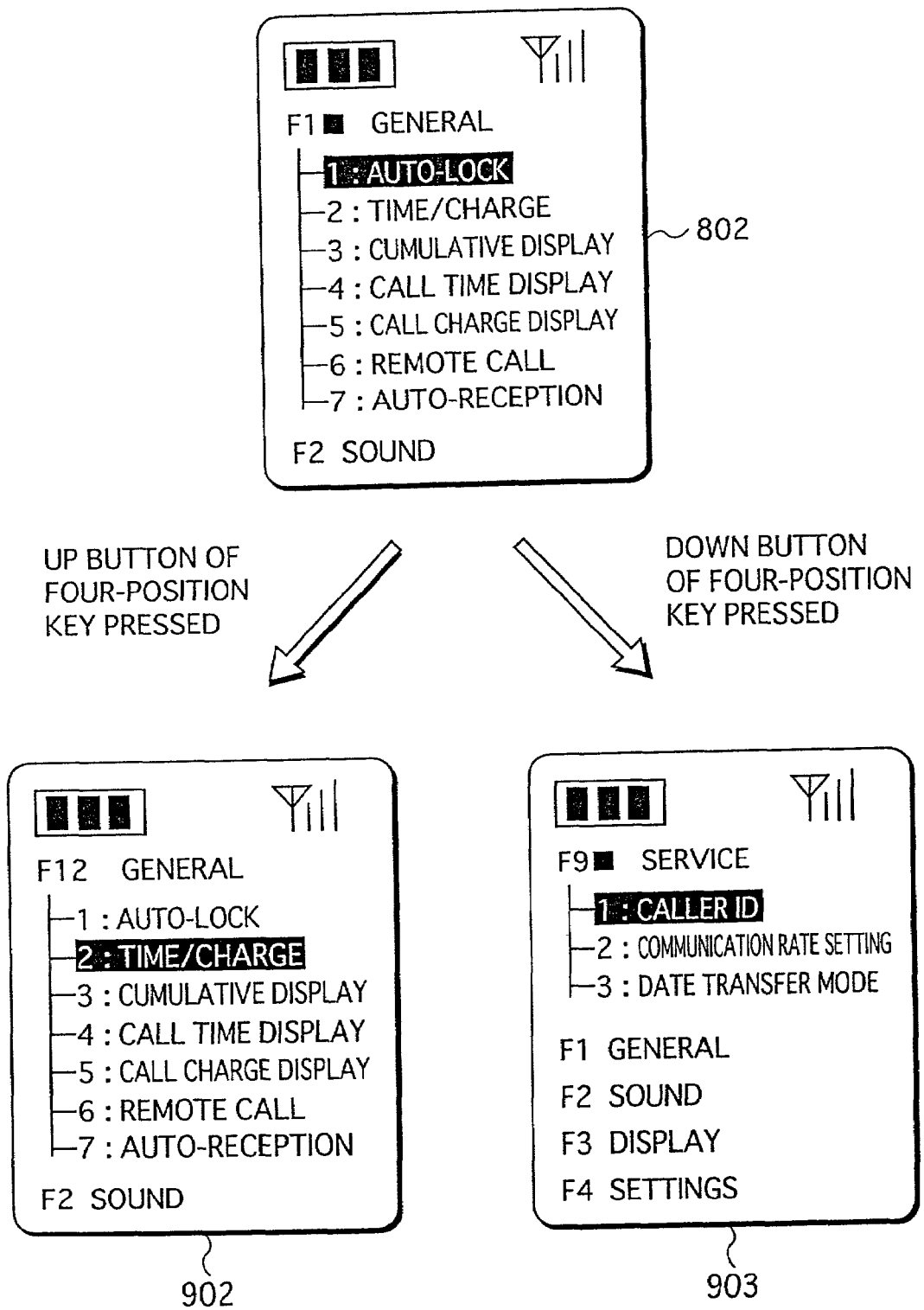
FIG. 9 shows examples of screen transitions from screen 802.

FIG. 9 shows examples of transitions from the screen 802.

When the down key of the four-position key 4 is pressed while the screen 802 is being displayed, the control unit 20 moves the highlight from "1: Auto-lock" to "2: Time/Charge", as shown by screen 902, showing that "2: Time/Charge" is selected.

On the other hand, when the down key of the four-position key 4 is pressed while the screen 802 is being displayed, the control unit 20 scrolls to the top level item "F9: Service" which is one above the top level item "F1: General" whose middle level items are being displayed, and displays the middle level items which come below the top level item "F9: Service", highlights the first middle level item, and displays other top level items in the remaining area. In this example, in the screen 802 there are no middle level items in the line above the highlighted "1: Auto-lock", therefore the control unit 20 displays the top level item that is one above and the middle level items belonging thereto, but it is possible to have the highlight switch from "1: Auto-lock" to "7: Auto-reception" instead.

FIG. 10 shows an example of transitions from the screen 802.

When the down key of the side scroll key 13 is pressed while the screen 802 is being displayed, the control unit 20 scrolls the display screen down to the top level item "F2: Sound" which is one below the top level item "F1: General", the middle level items of which are being displayed, and displays the middle level items of "F2: Sound", as shown in screen 1003. Here, the first middle level item is highlighted.

On the other hand, when the up key of the side scroll key 13 is pressed while the screen 802 is being displayed, the control unit 20 displays the top level item which is one above the top level item "F1: General" whose middle level items are being displayed. However, here there is no top level item, so the control unit 20 wraps around to display the bottom top level item "F9: Service", and also displays the middle level items thereof, as shown by screen 902.

In this way the control unit 20, in principle, moves the highlight of middle level items up and down according to the four-position key 4 when middle level items are being displayed. Furthermore, the control unit 20 scrolls the display of the top level items up and down according to the up and down keys of the side scroll key 13 respectively, and displays the middle level items of the top level item one above or one below.

Figure 11:
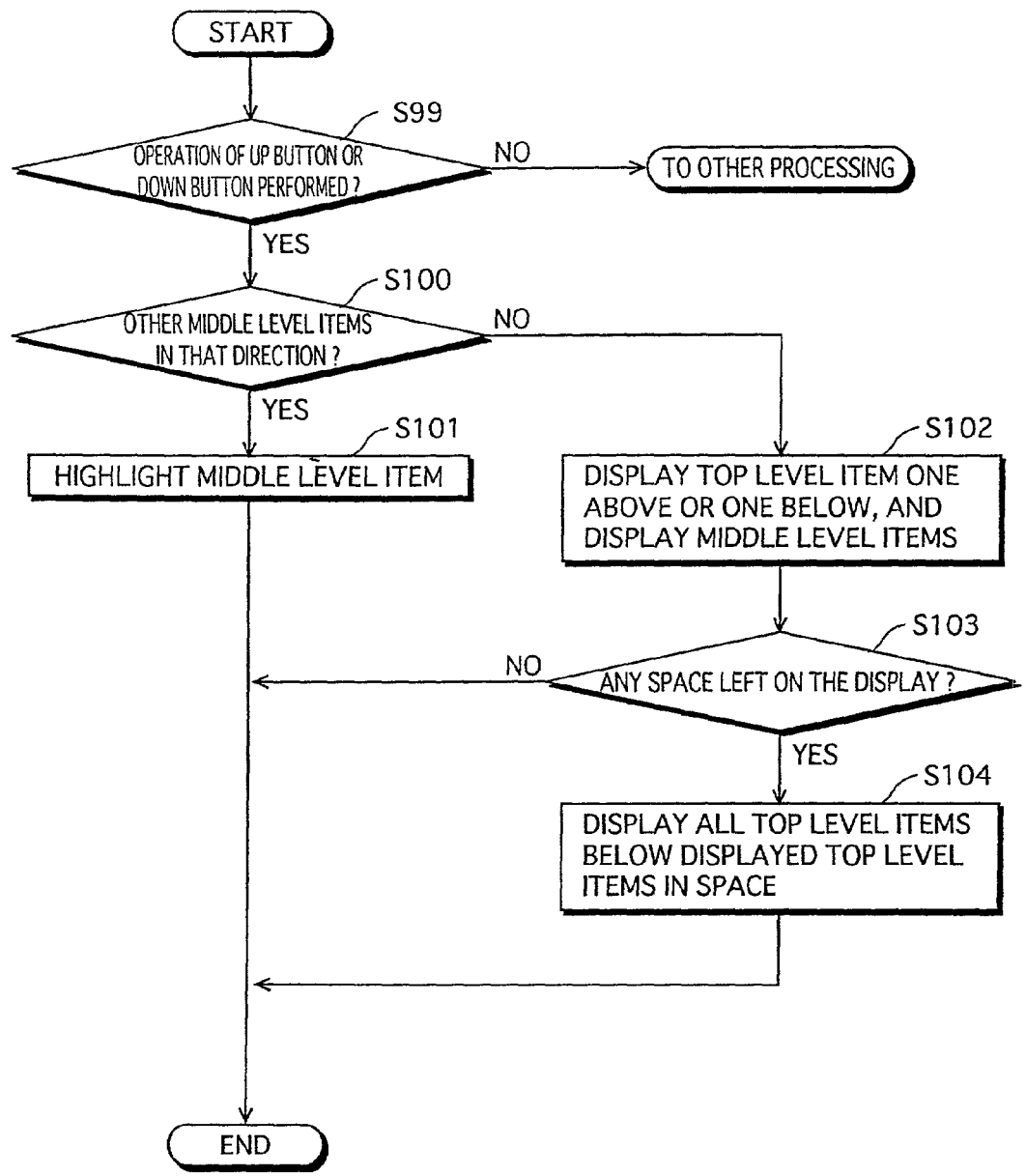
FIG. 11 is a flowchart showing the procedures of the control unit 20 that are explained above using FIG. 9.

FIG. 11 is a flowchart showing the procedure of the control unit 20 explained above using FIG. 9.

At step S99, while a top level item and the middle level items which come thereunder are being displayed (screen 802), the control unit 20 judges whether either the up button or the down button of the four-position key 4 has been pressed, and if either has been pressed, proceeds to step S100. When any other operation has been performed, the control unit 20 proceeds to other processing.

At step S100, when the up button has been pressed, the control unit moves the highlight to one line above the middle level item that was being highlighted. When the down button has been pressed, the control unit 20 judges whether there is a middle level item one below the middle level item being highlighted, and proceeds to step S101 when the judgement is affirmative, or proceeds to step S102 when the judgement is negative.

At step S101 the control unit 20 moves the highlight to up or down one middle level item according to the up button and the down button (screen 902).

At step S102 the control unit 20 scrolls up or down to a top level item which is either one above or one below the top level item whose middle level items are being displayed, and then displays the middle level items of the top level item which has been scrolled to.

At step S103 and step S104 the control unit 20 judges whether there is any area remaining below the middle level items being displayed, and if so displays as many following top level items as the number of remaining lines permits.

Figure 12:
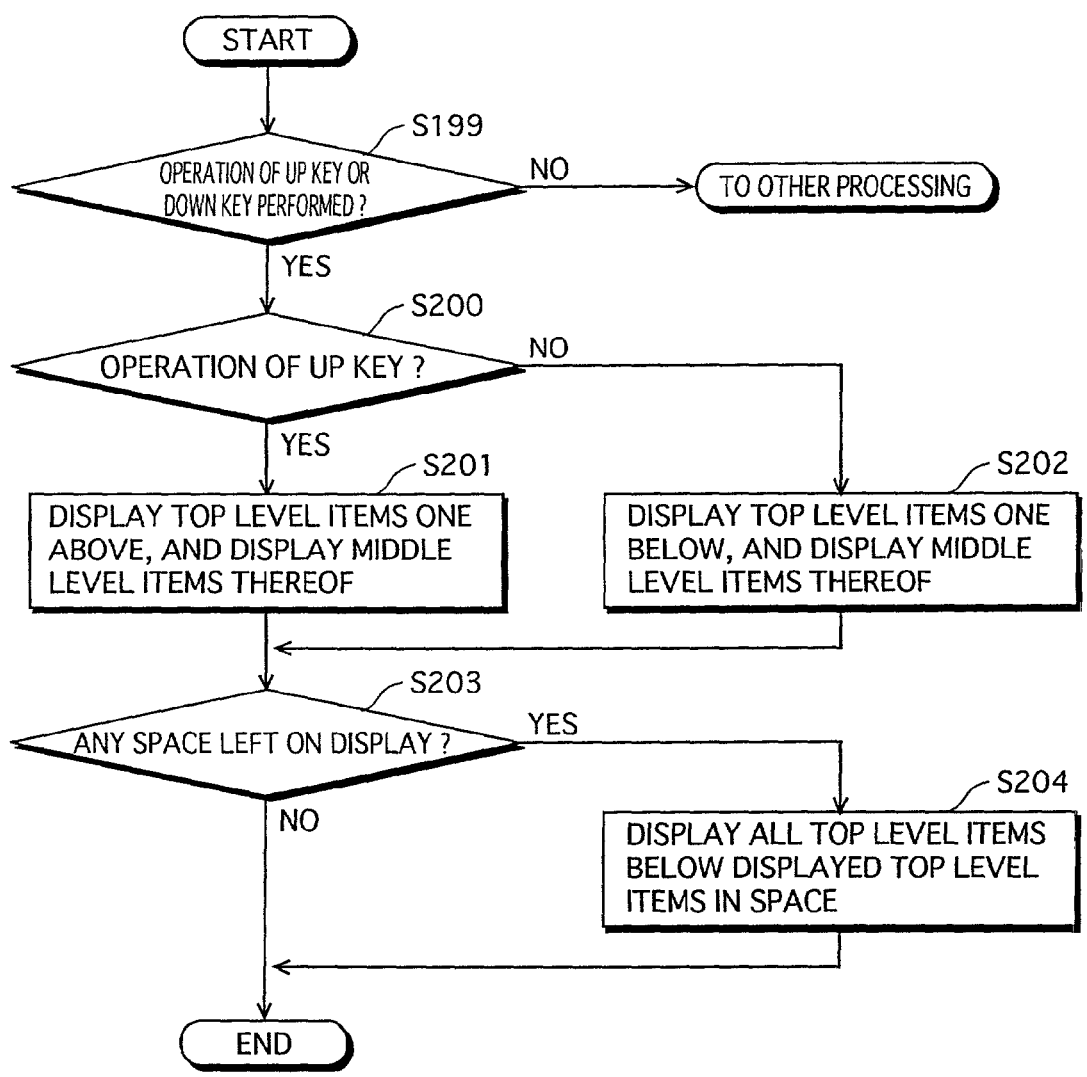
FIG. 12 is a flowchart showing the procedures of the control unit 20 that are explained above using FIG. 10.

FIG. 12 is a flowchart showing the procedure of the control unit 20 explained above using FIG. 10.

At step S199, while a top level item and the middle level items which belong thereto are being displayed, the control unit 20 judges whether either of the up key and the down key of the side scroll key 13 have been pressed, and when either is pressed, proceeds to step S200. When any other operation is performed the control unit 20 proceeds to other processing. Such other processing will not be described since it is not directly relevant to the present invention.

At step S200 the control unit 20 judges which of the up key and the down key of the side scroll key 13 has been pressed, and proceeds to step S201 when the up key was pressed, or to step S202 when the down key was pressed.

At step S201, the control unit 20 scrolls up to the top level item that is one above the top level item whose middle level items are being displayed, and displays the middle level items of the top level item.

At step S202, the control unit 20 scrolls down to the top level item which is one below the top level item whose middle level items are being displayed, and displays the middle level items of the top level item.

At step S203 and step S204, the control unit 20 judges whether there is any remaining area left on the display below the middle level items that are being displayed, and when the judgement is affirmative, displays top level items in the area.

As described, the control unit 20 automatically displays the middle level items which belong to a selected top level item, therefore no special operation is required form the user to be able to confirm the middle level items. This reduces the burden on the user. Conventionally, when the top level items are being displayed the user must press a key to have the middle level items which come under a top level item displayed, but in contrast no key operation is required with the present invention. Furthermore, when the control unit 20 displays the middle level items it also displays as many following top level items as the remaining area allows. This means that the user can confirm the proceeding top level items. Moreover, the control unit 20 moves the highlight of the middle level items according user operations of the up button and down button of the four-position key 4, and moves the highlight between the top level items and the middle items according to user operation of the up key and the down key of the side scroll key 13, therefore the user can confirm the top level items and the middle items with two types of operations and two types of display.

Third Embodiment

The following explains a third embodiment of the present invention.

The communication terminal of the present embodiment has the same outer view and block functions as the communication terminal of the first embodiment, therefore in the following explanation the structural components have the same reference numbers as in the first embodiment.

Figure 13:
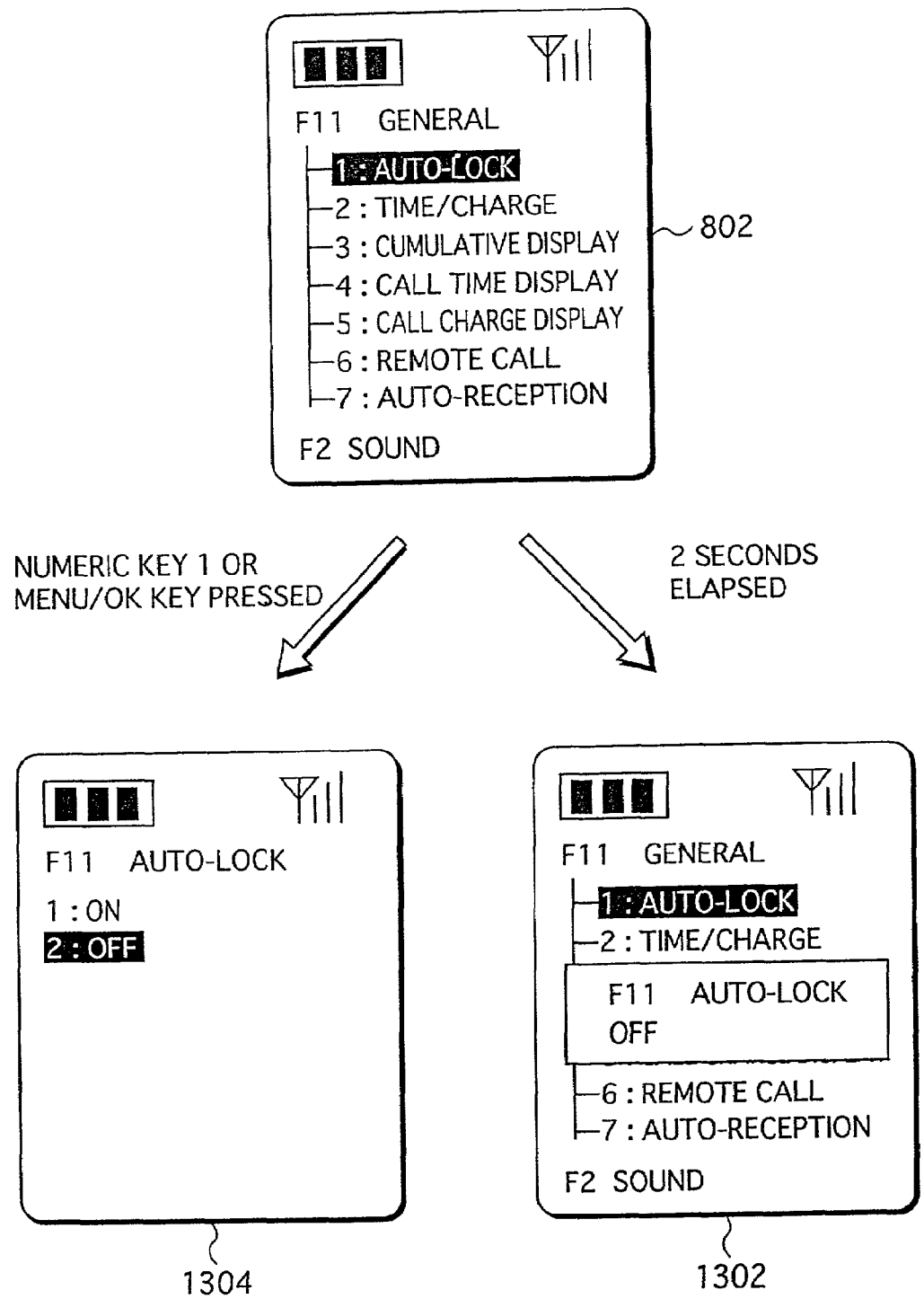
FIG. 13 shows examples of screen transitions from screen 802.
Figure 14:
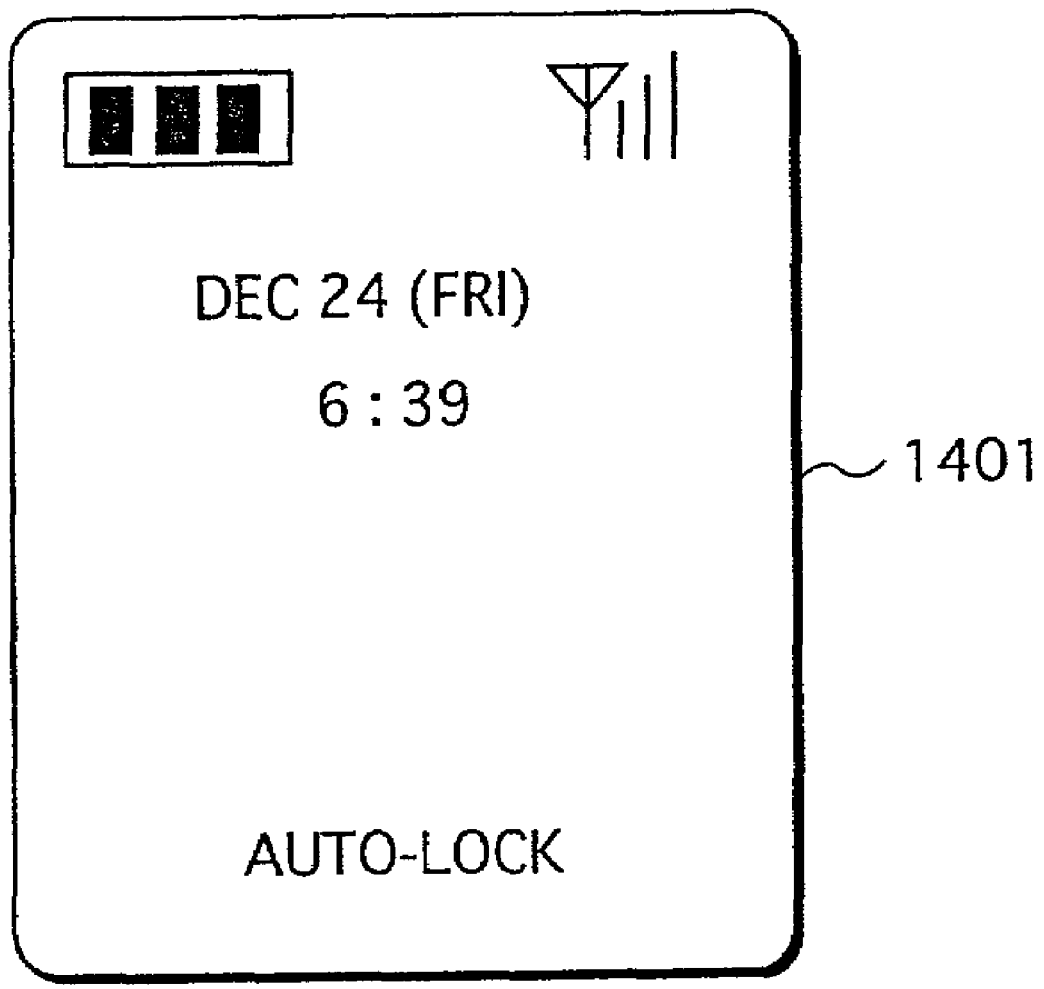

FIG. 13 shows examples of transitions from the screen 802.

When the numeric key "1" or the menu/OK key 6 is pressed while the screen 802 is being displayed, the control unit 20 switches the screen 802 to a screen 1304 and displays the setting value of the function "1: Auto-lock". In this case, the setting value is the highlighted "2: OFF". When either the numeric key "1" is pressed, or when the highlight is moved to the top line by an operation of the up button or the down button of the four-position key 4, and the menu/OK key 6 is subsequently pressed, the control unit 20 changes the setting value to "1: ON". When the auto-lock function is set to ON, the control unit 20 displays the screen shown by screen 1401, and the communication terminal 1 does not receive key functions until this function is released.

On the other hand, when a predetermined period of time elapses while one of the middle level items is highlighted such as in the screen 802, the control unit 20 retrieves the current setting value "OFF" of the highlighted "1: Auto-lock" is displayed together with the name "Auto-lock" in a rectangular pop-up display, as shown in screen 1302. Here, the predetermined period of time is, for example, 2 seconds.

Furthermore, when the menu/OK key 6 is pressed while the display state is the screen 1302, the control unit 20 substitutes the screen 1302 with the screen 1304. In addition, when one of the keys on the numeric key pad 8 or any other key that is allocated as "any key" is operated while the display state is the screen 1302, the control unit 20 returns from the screen 1304 to the screen 802.

Figure 15:
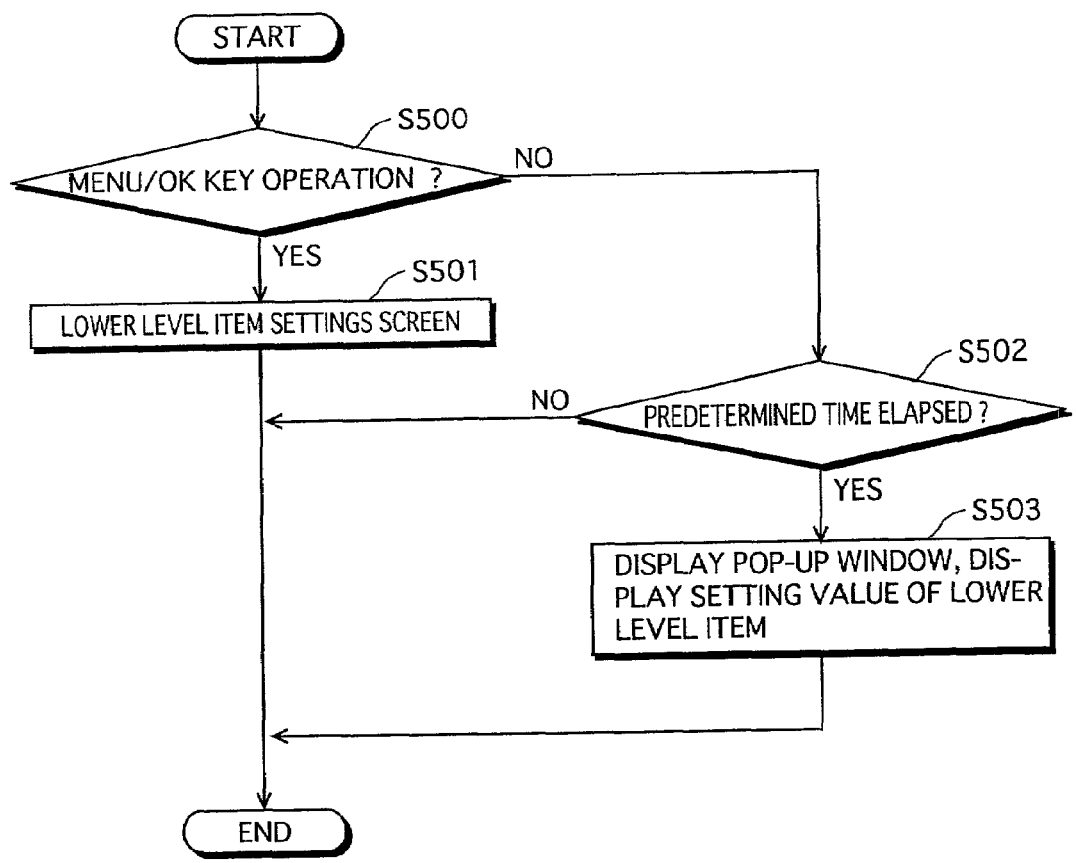
FIG. 15 is a flowchart showing the procedures of the control unit 20 that are explained above using FIG. 13.

FIG. 15 is a flowchart showing the procedure of the control unit 20 explained above using FIG. 13.

At step S500, while one of the displayed middle level items is highlighted, the control unit 20 judges whether the menu/OK key 6 has been pressed, and when the judgement is affirmative, proceeds to step S501.

At step S501 the control unit 20 retrieves the setting value of the highlighted middle level item from the RAM 20b and displays the retrieved setting value.

On the other hand, at step S502, while the menu/OK key 6 has not been pressed and there is no other operation performed, the control unit 20 measures the time period, judges whether a predetermined period of time has elapsed, and proceeds to step S503 when the predetermined period of time has elapsed.

At step S503 the control unit 20 retrieves the setting value of the displayed middle level item, and displays the retrieved setting value in a popup display overlaid on the screen displaying the middle level items.

As described, after a predetermined time period elapses while one middle level item is being highlighted, the control unit 20 retrieves the setting value of the highlighted middle level item from the RAM 20b, and displays the retrieved setting value in a popup display. Therefore, the user is able to confirm the setting value without having to perform any particular operation. This reduces the burden on the user in operating the communication terminal 1.

Although the present invention has been fully described by way of examples with reference to accompanying drawings, it is to be noted that various changes and modifications will be apparent to those skilled in the art. Therefore, unless such changes and modifications depart form the scope of the present invention, they should be construed as being included therein.

What is claimed is:

1. A communication terminal which displays, when a memory dial function is used, a plurality of registered names of parties to which a telephone call is possibly made, and initiates, according to a predetermined operation, the telephone call to a telephone number which corresponds to a selected registered name, comprising:
    a call destination selection unit operable to select one name from the displayed plurality of registered names;
    a measuring unit operable to measure a length of time for which the selected registered name is displayed;
    a first display unit operable to display when the length of time measured by the measuring unit exceeds a predetermined length of time, a plurality of telephone numbers and e-mail addresses which correspond to the selected registered name;
    a second display unit operable to display when the predetermined operation is performed while the plurality of telephone numbers and e-mail addresses is being displayed on the first display unit, only the telephone numbers;
    a telephone number selection unit operable to select one telephone number from the plurality of telephone numbers being displayed on the second display unit; and
    a call initiation unit operable to initiate a telephone call to the selected telephone number.

2. The communication terminal of claim 1 wherein the first display means forms a popup window on part of a screen in which the plurality of registered names are being simultaneously displayed, and displays the plurality of telephone numbers and e-mail addresses of the selected setting item in the popup window.

3. A display method for a communication terminal which displays, when a memory dial function is used, a plurality of registered names of parties to which a telephone call is possibly made, and initiates, according to a predetermined operation, the telephone call to a telephone number which corresponds to a selected registered name, the display method comprising:
- a first step for selecting one name from the displayed plurality of registered names;
- a second step for measuring a length of time for which the selected registered name is displayed;
- a third step for displaying, when the length of time measured by the second step exceeds a predetermined length of time, a plurality of telephone numbers and e-mail addresses which correspond to the selected registered name;
- a fourth step for displaying, when the predetermined operation is performed while the plurality of telephone numbers and e-mail addresses is being displayed by the third step, only the telephone numbers;
- a fifth step for selecting one telephone number from the plurality of telephone numbers being displayed by the fourth step; and
- a sixth step for initiating a telephone call to the selected telephone number.

4. The communication terminal of claim 1 wherein the third step includes a seventh step for forming a popup window on part of a screen in which the plurality of registered names are being simultaneously displayed, and displaying the plurality of telephone numbers and e-mail addresses of the selected setting item in the popup window.

5. A communication terminal having a display that displays a plurality of setting items for related internal functions of the communication terminal, composing:
- an operation unit operable to receive, according to key input, an instruction for selecting a setting item from the plurality of setting items displayed on the display; and
- a control unit operable to measure a length of time from when the selected setting item is selected according to the instruction, and when the measured length of time exceeds a predetermined length of time, control such that the display displays a setting value of the selected setting item on part of the display, overlaid in an area in which the plurality of setting items are being displayed.

6. The communication terminal of claim 5 wherein, when the measured length of time from when the setting item is selected according to the instruction exceeds the predetermined length of time, the control unit controls such that, by causing a window that displays the setting value of the selected setting item to pop up on part of a display screen of the display the selected setting value is displayed on part of the display, overlaid in the area in which the plurality of setting items are being displayed.

7. The communication terminal of claim 6 wherein, while the setting value of the selected setting item is being displayed on the display, when the operation unit receives, according to key input, an instruction for selecting another of the setting items, the control unit controls such that display of the setting value is stopped.

8. The communication terminal of claim 5 wherein, while the setting value of the selected setting item is being displayed on the display, when the operation unit receives, according to key input, an instruction for selecting another of the setting items, the control unit controls such that display of the setting value is stopped.

9. A display method for a communication terminal having a display that displays a plurality of setting items for related internal functions of the communication terminal, the display method comprising:
- a first step of receiving, according to key input, an instruction for selecting a setting item from the plurality of setting items displayed on the display; and
- a second step of measuring a length of time from when the selected setting item is selected according to the instruction, and when the measured length of time exceeds a predetermined length of time, controlling such that the display displays a setting value of the selected setting item on part of the display, overlaid in an area in which the plurality of setting items are being displayed.

10. The display method of claim 9 wherein, in the second step, when the measured length of time from when the setting item is selected according to the instruction exceeds the predetermined length of time, control is performed by causing a window that displays the setting value of the selected setting item to pop up on part of a display screen of the display, the selected setting value is displayed on part of the display, overlaid in the area in which the plurality of setting items are being displayed.

11. The display method of claim 10, further comprising:
- a third step of, while the setting value of the selected setting item is being displayed on the display, when the operation unit receives, according to key input, an instruction for selecting another of the setting items, stopping display of the setting value.

12. The display method of claim 9, further comprising:
- a third step of, while the setting value of the selected setting item is being displayed on the display, when the operation unit receives, according to key input, an instruction for selecting another of the setting items, stopping display of the setting value.

13. A communication terminal comprising:
- a display operable to display, when a memory dial function is used, a plurality of registered names of parties to which a telephone call is possibly made; an operation unit; and a control unit, the communication terminal initiating the telephone call to a telephone number which corresponds to a registered name selected according to key input with respect to the operation unit, wherein
- the operation unit receives, according to key input, an instruction for selecting one name from the plurality of registered names displayed on the display, and
- the control unit measures a length of time for which the selected registered name is displayed;
- when the measured length of time exceeds a predetermined length of time, controls such that a plurality of telephone numbers and e-mail addresses which correspond to the selected registered name are displayed on the display,
- when a predetermined key input is performed with respect to the operation unit while the plurality of telephone numbers and e-mail addresses which correspond to the selected registered name are being displayed on the display, controls such that only the plurality of telephone numbers are displayed on the display, and
- when the operation unit receives an instruction for selecting one telephone number from the displayed plurality of telephone numbers, initiating a telephone call to the selected telephone number.

14. The communication terminal of claim 13 wherein, when the measured length of time for which the selected registered name is displayed exceeds the predetermined length of time, the control unit controls such that a window that displays a plurality of telephone numbers and e-mail addresses of the selected registered name pops up on part of a display screen of the display.

15. A display method for a communication terminal including: a display operable to display, when a memory dial function is used, a plurality of registered names of parties to which a telephone call is possibly made; an operation unit; and a control unit, the communication terminal initiating the telephone call to a telephone number which corresponds to a registered name selected according to key input with respect to the operation unit, the display method comprising:
   a first step of receiving, according to key input, an instruction for selecting one name from the plurality of registered names displayed on the display;
   a first step of receiving, according to key input, an instruction for selecting one name from the plurality of registered names displayed on the display;
   a second step of measuring a length of time for which the selected registered name is displayed;
   a third step of, when the measured length of time exceeds a predetermined length of time, controlling such that a plurality of telephone numbers and e-mail addresses which correspond to the selected registered name are displayed on the display;
   a fourth step of, when a predetermined key input is performed with respect to the operation unit while the plurality of telephone numbers and e-mail addresses which correspond to the selected registered name are being displayed on the display, controlling such that only the plurality of telephone numbers are displayed on the display; and
   a fifth step of, when the operation unit receives an instruction for selecting one telephone number from the displayed plurality of telephone numbers, initiating a telephone call to the selected telephone number.

16. The communication terminal of claim 15 wherein, in the third step, when the measured length of time for which the selected registered name is displayed exceeds the predetermined length of time, control is performed such that a window that displays a plurality of telephone numbers and e-mail addresses of the selected registered name pops up on part of a display screen of the display.

17. A communication terminal having a display that displays a plurality of setting items for related internal functions of the communication terminal, comprising:
   a highlighted display unit operable to cause highlighted display of any of the plurality of setting items being displayed on the display;
   an operation unit operable to receive an operation for moving a position of the highlighted display performed by the highlighted display unit; and
   a control unit operable to measure time from when the position of the highlighted display moves, and when the measured length of time exceeds a predetermined length of time, to cause a setting value of a currently highlighted setting item to be displayed on part of the display, overlaid in an area in which the plurality of setting items are being displayed.

18. A communication terminal comprising:
   a display unit for showing a plurality of setting items for related internal functions of the communication terminal and for highlighting only one of the setting items at a time to distinguish that one setting item from the remainder of the plurality of setting items;
   an operation unit for receiving an instruction from a user for causing the display unit to highlight one of the plurality of setting items; and
   a control unit measuring a time period from when the setting item is initially highlighted, wherein when the measured length of time exceeds a first predetermined length of time, the control unit automatically activates the display unit to indicate a setting value associated with the highlighted setting item whereby a user is not required to enter a further instruction to the operation unit, wherein the setting value is overlaid in an area of the display in which the plurality of setting items are being displayed.

19. The communication terminal of claim 18 wherein after a second predetermined length of time, the control unit removes from the display unit the indication of the setting value associated with the highlighted setting item.

20. The communication terminal of claim 19 wherein the control unit only once shows on the display unit the indication of the setting value associated with the highlighted item and only once removes from the display unit the indication of the setting value associated with the highlighted item when the user has only entered the instruction for causing the display unit to highlight the highlighted item.

21. A communication terminal having a display that displays a plurality of setting items for related internal functions of the communication terminal, comprising:
   an operation unit operable to receive, according to key input, an instruction for selecting, a setting item from the plurality of setting items displayed on the display; and
   a control unit operable to measure a length of time from when the selected setting item is selected according to the instruction, and when the measured length of time exceeds a predetermined length of time, control such that the display displays a setting value of the selected setting item on part of the display, excluding a part on which the selected setting item is being displayed.

22. A communication terminal having a display that displays a plurality of setting items for related internal functions of the communication terminal, comprising:
   a highlighted display unit operable to cause highlighted display of any of the plurality of setting items being displayed on the display;
   an operation unit operable to receive an operation for moving a position of the highlighted display performed by the highlighted display unit; and
   a control unit operable to measure time from when the position of the highlighted display moves, and when the measured length of time exceeds a predetermined length of time, control such that a setting value of a currently highlighted setting item is displayed on part of the display excluding a part on which the selected item is being displayed.

* * * * *